(12) United States Patent
Shiu et al.

(10) Patent No.: US 8,773,310 B2
(45) Date of Patent: Jul. 8, 2014

(54) METHODS FOR FORMING CAVITY ANTENNAS

(75) Inventors: Sam Shiu, San Jose, CA (US); Robert W. Schlub, Campbell, CA (US); Ruben Caballero, San Jose, CA (US)

(73) Assignee: Apple Inc., Cupertino, CA (US)

(*) Notice: Subject to any disclaimer, the term of this patent is extended or adjusted under 35 U.S.C. 154(b) by 988 days.

(21) Appl. No.: 12/750,660

(22) Filed: Mar. 30, 2010

(65) Prior Publication Data

US 2011/0241943 A1    Oct. 6, 2011

(51) Int. Cl.
*H01Q 1/38* (2006.01)

(52) U.S. Cl.
USPC ............. 343/700 MS; 343/770; 343/767

(58) Field of Classification Search
USPC .................................. 343/700 MS
See application file for complete search history.

(56) References Cited

U.S. PATENT DOCUMENTS

| | | | |
|---|---|---|---|
| 2,812,514 A | 11/1957 | Smith | |
| 2,834,959 A | 5/1958 | Dome | |
| 3,312,976 A | 4/1967 | Gregory | |
| 4,208,660 A | 6/1980 | McOwen | |
| 4,245,222 A | 1/1981 | Eng et al. | |
| 4,710,775 A | 12/1987 | Coe | |
| 4,733,245 A * | 3/1988 | Mussler | 343/769 |
| 5,648,786 A | 7/1997 | Chung et al. | |
| 5,917,454 A | 6/1999 | Hill et al. | |
| 6,002,311 A * | 12/1999 | Wey et al. | 333/219.1 |
| 6,081,729 A | 6/2000 | Bauerschmidt et al. | |
| 6,198,453 B1 * | 3/2001 | Chew | 343/771 |
| 6,225,959 B1 | 5/2001 | Gordon | |
| 6,339,400 B1 | 1/2002 | Flint et al. | |
| 6,373,351 B1 | 4/2002 | Kubota et al. | |
| 6,380,930 B1 | 4/2002 | Van Ruymbeke | |
| 6,686,886 B2 | 2/2004 | Flint et al. | |
| 6,853,336 B2 | 2/2005 | Asano et al. | |

(Continued)

FOREIGN PATENT DOCUMENTS

| GB | 2074792 | 11/1981 |
|---|---|---|
| JP | 61284102 | 12/1986 |
| WO | 2010/013982 | 2/2010 |

OTHER PUBLICATIONS

Vazquez et al., U.S. Appl. No. 12/238,384, filed Sep. 25, 2008.

(Continued)

*Primary Examiner* — Jacob Y Choi
*Assistant Examiner* — Kyana R McCain
(74) *Attorney, Agent, or Firm* — Treyz Law Group; G. Victor Treyz; Michael H. Lyons

(57) ABSTRACT

An antenna resonating element may be mounted in an antenna cavity. The antenna resonating element may have a printed circuit board substrate with a patterned metal layer. Components may be soldered to the antenna resonating element using solder with a given melting point before soldering the antenna resonating element the antenna cavity using solder with a lower melting point. Solder widow openings may be formed in the antenna resonating element and antenna cavity to allow for application of solder paste. Engagement features and alignment structures may be used to align the antenna resonating element relative to the antenna cavity. The antenna cavity may have a curved opening. The printed circuit board substrate may be bent to the shape of the curved opening before soldering components to the printed circuit board. An elastomeric fixture may be used to hold the antenna resonating element to the cavity during soldering.

20 Claims, 12 Drawing Sheets

(56) References Cited

U.S. PATENT DOCUMENTS

| | | | |
|---|---|---|---|
| 6,894,650 | B2 | 5/2005 | Darden et al. |
| 6,919,853 | B2* | 7/2005 | Jordan et al. ............ 343/770 |
| 6,950,069 | B2 | 9/2005 | Gaucher et al. |
| 2003/0231086 | A1 | 12/2003 | Ishikawa et al. |
| 2009/0128263 | A1* | 5/2009 | Hesselbarth ............ 333/230 |
| 2009/0153407 | A1 | 6/2009 | Zhang et al. |
| 2009/0153412 | A1 | 6/2009 | Chiang et al. |

OTHER PUBLICATIONS

Chiang et al., U.S. Appl. No. 12/401,599, filed Mar. 10, 2009.
Vazquez et al., U.S. Appl. No. 12/486,496, filed Jun. 17, 2009.
Chiang et al., U.S. Appl. No. 12/104,359, filed Mar. 16, 2008.
Guterman et al., U.S. Appl. No. 12/553,943, filed Sep. 3, 2009.
Vazquez et al., U.S. Appl. No. 12/553,944, filed Sep. 3, 2009.
Arnold, Shawn, "Flexible FR-4: A Low-Cost Replacement for Polyimide-based Circuits", Jun. 1, 2004, [online], retrieved Feb. 8, 2010, <http://www.circuitree.com/Articles/Feature_Article/305aa202930f7010VgnVCM100000f932a8c0_>.
Bevelacqua et al., U.S. Appl. No. 12/750,661, filed Mar. 30, 2010.
Chiang et al., U.S. Appl. No. 12/500,570, filed Jul. 9, 2009.
Chiang, U.S. Appl. No. 12/356,496, filed Jan. 20, 2009.
Kotani et al: "A rectangular cavity 1 backed slot antenna with parasitic slots", IEEE Antennas and Propagation Society International Symposium. 2001 Digest. APS. Boston, MA, Jul. 8-13, 2001; vol. 3, Jul. 8, 2001, pp. 166-169.

* cited by examiner

METHODS FOR FORMING CAVITY ANTENNAS

BACKGROUND

This relates generally to antennas, and more particularly, to cavity antennas and methods for forming cavity antennas.

Electronic devices often incorporate wireless communications circuitry. For example, computers may communicate using the Wi-Fi® (IEEE 802.11) bands at 2.4 GHz and 5.0 GHz. Communications are also possible in cellular telephone telecommunications bands and other wireless bands.

To satisfy consumer demand for compact and aesthetically pleasing wireless devices, manufacturers are continually striving to produce antennas with appropriate shapes and small sizes. At the same time, manufacturers are attempting to ensure that antennas operate efficiently and do not interfere with nearby circuitry. These concerns are sometimes at odds with one another. If care is not taken, a small antenna or an antenna with a shape that allows the antenna to fit within a confined device housing may tend to exhibit poor efficiency or generate radio-frequency interference.

To satisfy design constraints while taking account of performance and interference concerns, wireless devices such as computers have been provided with cavity antennas. Cavity antennas include an antenna cavity and an antenna resonating element that is mounted in the cavity. The presence of the antenna cavity may help block radio-frequency interference and direct radio-frequency signals in desired directions. However, conventional cavity antennas can be difficult to fabricate and do not always offer desired levels of performance.

It would therefore be desirable to be able to provide improved cavity antennas and methods for forming cavity antennas.

SUMMARY

A cavity antenna may have an antenna resonating element mounted in an opening in an antenna cavity. The antenna resonating element may have an antenna resonating element substrate with a patterned metal layer that forms an antenna slot, an antenna patch, or other antenna resonating element trace patterns. The substrate may be formed from a printed circuit board material such as a thin flexible sheet of fiberglass-filled epoxy. The substrate may be flexed about a flex axis so as to mate with curved edges in the opening of the antenna cavity.

Peripheral edges of the antenna resonating element may be provided with a ring of gold or other material that accepts solder. Solder may be used to connect the peripheral edges of the antenna resonating element to the curved edges of the opening of the antenna cavity.

The edges of the antenna resonating element and the edges of the opening may be provided with mating engagement features such as tooth-and-groove features. Alignment clips or plastic alignment structures may be attached to the antenna resonating element and used to align the antenna resonating element to the antenna cavity. Solder paste windows may be formed at the edges of the opening to allow solder to be applied.

Components such as capacitors, cable connectors, and other electrical components may be soldered to the printed circuit board substrate of the antenna resonating element. To ensure that the printed circuit board substrate can flex properly during subsequent assembly operations, the printed circuit board substrate can be bent into a flexed non-planar shape before the components are soldered to the board. Solder with a lower melting temperature than that used to solder the components may be used to solder the antenna resonating element to the cavity.

An elastomeric support structure or other fixture may be used to hold the antenna resonating element to the cavity during soldering. The elastomeric support structure may be formed from a soft material that has a low thermal conductivity and low heat capacity such as silicone.

Further features of the invention, its nature and various advantages will be more apparent from the accompanying drawings and the following detailed description of the preferred embodiments.

DETAILED DESCRIPTION

Antennas are used in wireless electronic devices to support wireless communications. The wireless electronic devices may be desktop computers, computer monitors, computer monitors containing embedded computers, wireless computer cards, wireless adapters, televisions, set-top boxes, gaming consoles, routers, or other electronic equipment. If desired, portable electronic devices such as laptop computers, tablet computers, or small portable computers of the type that are sometimes referred to as handheld computers may be provided with antennas. Antennas may be used in wireless electronic devices such as cellular telephones or media players. The wireless electronic devices in which the antennas are used may also be somewhat smaller devices. Examples of smaller wireless electronic devices include wrist-watch devices, pendant devices, handheld devices, headphone and earpiece devices, and other wearable and miniature devices.

Figure 1:
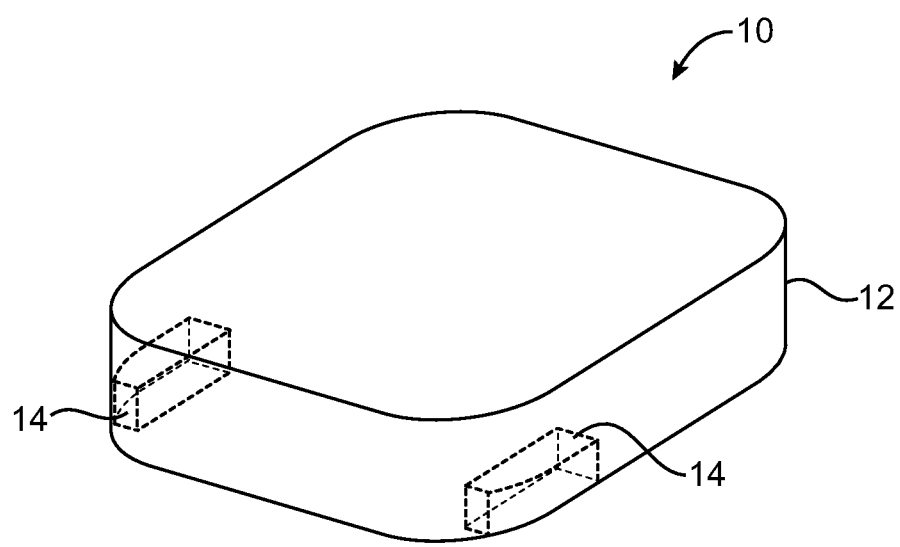
FIG. 1 is a perspective view of an illustrative electronic device with antennas in accordance with an embodiment of the present invention.

An illustrative electronic device that includes antennas is shown in FIG. 1. Electronic device 10 of FIG. 1 may have a housing such as housing 12. Housing 12 may include plastic walls, metal housing structures, structures formed from carbon-fiber materials or other composites, glass, ceramics, or other suitable materials. Housing 12 may be formed using a single piece of material (e.g., using a unibody configuration) or may be formed from a frame, housing walls, and other individual parts that are assembled to form a completed housing structure.

Antennas such as antennas 14 may be mounted within housing 12 (as an example). In general, there may be one antenna, two antennas, or three or more antennas in housing 12. In the example of FIG. 1, there are two antennas in device 10 formed flush with curved walls in housing 12. This is merely illustrative.

Antennas 14 may include an antenna resonating element and, if desired, a cavity structure. In a cavity-type antenna, a resonating element structure is placed adjacent to an opening in a conductive antenna cavity. The presence of the cavity can help prevent radio-frequency interference between the antenna and surrounding electrical components in device 10 and can help direct radio-frequency antenna signals in desired directions. A cavity structure may be used in connection with a patch antenna, a strip antenna, antenna resonating element traces with multiple arms, bends, and other features, or other suitable antenna resonating element structures. With one suitable configuration, which is sometimes described herein as an example, cavity-backed slot antennas are formed in which a slot antenna resonating element is backed by an antenna cavity. This is merely illustrative. In general, any suitable cavity antenna structures may be used in device 10 if desired.

Figure 2:
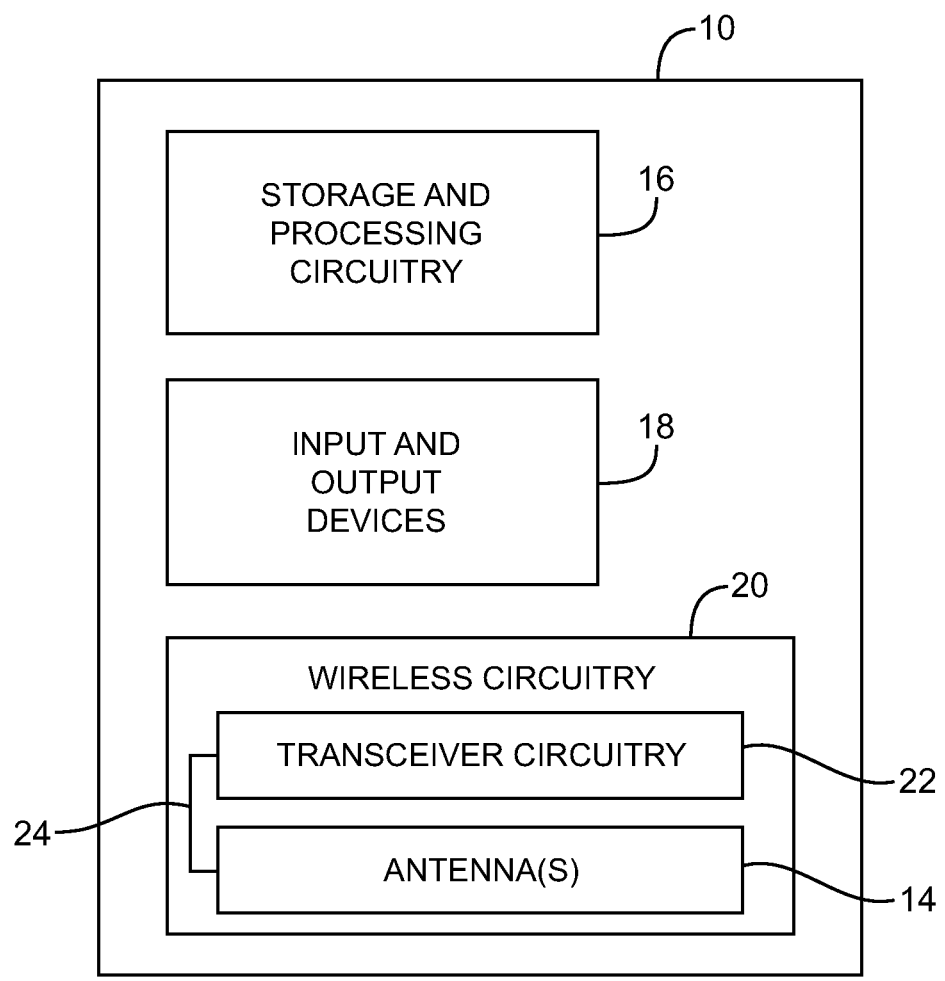
FIG. 2 is a circuit diagram of an illustrative electronic device with antennas in accordance with an embodiment of the present invention.

As shown in FIG. 2, device 10 may include storage and processing circuitry 16. Storage and processing circuitry 16 may include one or more different types of storage such as hard disk drive storage, nonvolatile memory (e.g., flash memory or other electrically-programmable-read-only memory), volatile memory (e.g., static or dynamic random-access-memory), etc. Storage and processing circuitry 16 may be used in controlling the operation of device 10. Processing circuitry in circuitry 16 may be based on processors such as microprocessors, microcontrollers, digital signal processors, dedicated processing circuits, power management circuits, audio and video chips, and other suitable integrated circuits.

With one suitable arrangement, storage and processing circuitry 16 may be used to run software on device 10, such as internet browsing applications, voice-over-internet-protocol (VOIP) telephone call applications, email applications, media playback applications, operating system functions, antenna and wireless circuit control functions, etc. Storage and processing circuitry 16 may be used in implementing suitable communications protocols. Communications protocols that may be implemented using storage and processing circuitry 16 include internet protocols, wireless local area network protocols (e.g., IEEE 802.11 protocols—sometimes referred to as Wi-Fi®), protocols for other short-range wireless communications links such as the Bluetooth® protocol, protocols for handling cellular telephone communications services, etc.

Input-output devices 18 may be used to allow data to be supplied to device 10 and to allow data to be provided from device 10 to external devices. Examples of input-output devices 18 that may be used in device 10 include display screens such as touch screens (e.g., liquid crystal displays or organic light-emitting diode displays), buttons, joysticks, click wheels, scrolling wheels, touch pads, key pads, keyboards, microphones, speakers and other devices for creating sound, cameras, sensors, etc. A user can control the operation of device 10 by supplying commands through devices 18 or by supplying commands to device 10 through an accessory such as a keyboard or mouse that communicates with device 10 through a wireless or wired communications link. Devices 18 or accessories that are in communication with device 10 through a wired or wireless connection may be used to convey visual or sonic information to the user of device 10. Device 10 may include connectors for forming data ports (e.g., for attaching external equipment such as computers, accessories, etc.).

Wireless communications devices 20 may include communications circuitry such as radio-frequency (RF) transceiver circuitry 22. Circuitry 22 may include one or more integrated circuits such as baseband processors, radio-frequency transceivers, power amplifiers, matching circuits, filters, and switching circuitry. One or more transmission lines such as transmission lines 24 may be used to route radio-frequency antenna signals between antennas 14 and transceiver circuitry 22. Transmission lines 24 may include microstrip transmission lines, coaxial cable transmission lines, etc.

Figure 3:
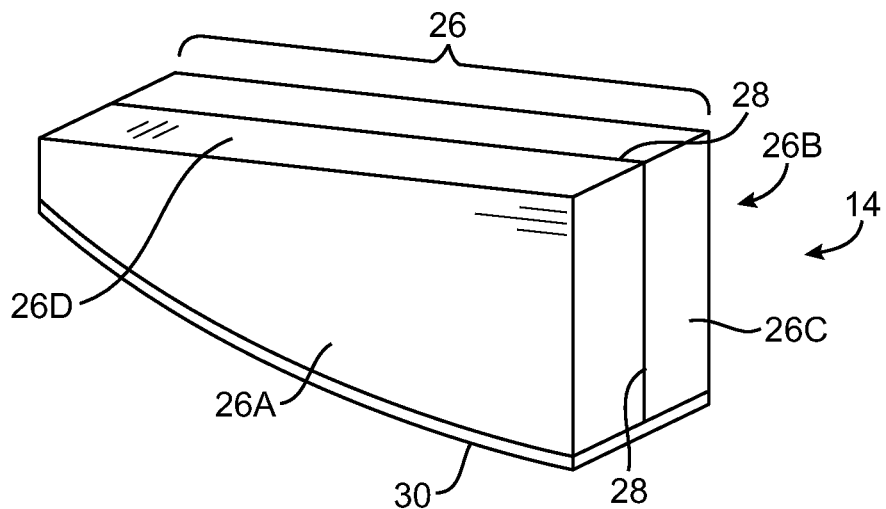
FIG. 3 is a bottom perspective view of an illustrative antenna in accordance with an embodiment of the present invention.

As shown in FIG. 1, device 10 may have a housing with curved sidewalls. To accommodate curved sidewalls or to satisfy other design constraints, it may be desirable to form a cavity-backed antenna with a curved antenna resonating element and a corresponding curved cavity opening. FIG. 3 shows an illustrative cavity antenna having a curved surface that may be used in a device such as device 10 of FIG. 1. FIG. 3 is a bottom perspective view of cavity antenna 14. As shown in FIG. 3, cavity antenna 14 may have a cavity structure such as cavity 26 and an antenna resonating element such as antenna resonating element 30. Cavity structure 26 may be formed from metal or other conductive materials, plastic or other dielectric support structures that have been coated with metal or other conductive materials, or other suitable conductive structures. If desired, cavity structure 26 may be formed from first and second pieces. For example, cavity structure 26 may be formed from first and second metal structures that are joined and laser welded at seam 28.

Antenna resonating element 30 may be formed on a substrate such as a printed circuit board that is mounted in an opening in cavity 26. In FIG. 3, cavity 26 is oriented so that its opening faces downward. As shown, cavity 26 may include planar vertical sidewall structures such as sidewalls 26A, 26B, and 26C and planar rear wall 26D. If desired, cavity 26 may be formed in other shapes (e.g., shapes with horizontally and vertically curved walls, shapes with bends, etc.). The example of FIG. 3 is merely illustrative.

Figure 4:
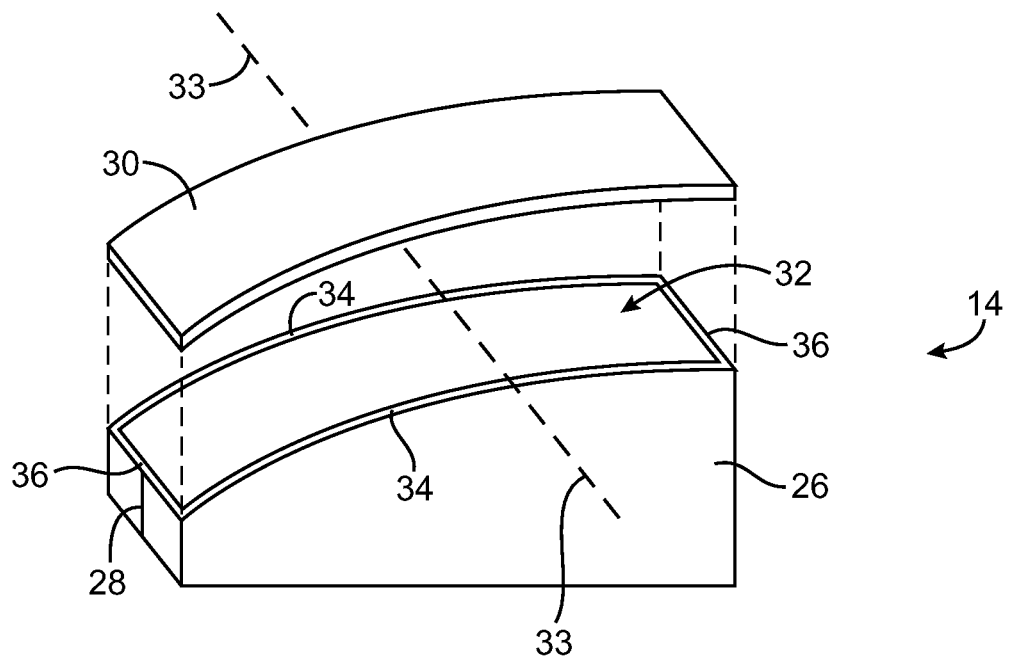
FIG. 4 is an exploded top perspective view of an illustrative antenna in accordance with an embodiment of the present invention.

FIG. 4 is an exploded perspective view of antenna 14 of FIG. 3 in an orientation in which cavity 26 is facing upwards. In this orientation, cavity opening 32 is visible at the top of cavity 26. Cavity opening 32 has four edges (in the FIG. 4 example), including curved edges 34 and straight edges 36. Because edges 34 are curved, opening 32 and other openings of this type are sometimes referred to as curved and non-planar antenna cavity openings. Antenna resonating element 30 may have a curved shape such as a non-planar curved layer that is formed by flexing element 30 about flex axis 33. As a result, element 30 mates with the curved shape of non-planar opening 32. This provides antenna 14 with a curved shape that may fit against curved housing walls 12 of device 10, as shown in FIG. 1.

Antenna resonating element 30 may be formed from stamped metal foil, wires, traces of copper or other conductive materials that are formed on a dielectric substrate, combinations of these conductive structures, or other suitable conductive structures. The resonating elements may be based on patch antenna designs, inverted-F antenna designs, monopoles, dipoles, slots, antenna coils, planar inverted-F antennas, or other types of antenna. With one suitable arrangement, which is sometimes described herein as an example, antenna resonating element 30 is formed from a layer of metal or other conductive material (sometimes referred to as a ground plane element or ground plane) in which one or more slot antenna structures have been formed. The slot structures may, for example, be defined by rectangular or angled-rectangular openings in the conductive layer. The conductive layer may be formed from one or more copper layers (e.g., patterned copper traces) or other metals (as examples).

The conductive portions of antenna resonating element 30 may be formed on a dielectric substrate such as an injection-molded or compression-molded plastic part, on a rigid printed circuit board, or on a substrate formed from rigid and flexible portions ("rigid flex"). Antenna resonating element 30 may also be formed on a flexible printed circuit board that is based on a thin flexible layer of polymer such as a thin flexible sheet of polyimide. If desired, a support structure (e.g., a rigid support or a flexible layer of plastic) may be used to support the thin flexible polyimide sheet.

Antenna resonating element 30 may also be formed from rigid printed circuit board materials that have been formed in sufficiently thin layers to render them flexible. For example, antenna resonating element 30 may be formed from a layer of FR-4 (a flame retardant fiberglass-filled epoxy printed circuit board substrate material) that is about 0.09 to 0.2 mm thick, is about 0.05 to 0.3 mm thick, is less than 0.25 mm thick, is less than 0.2 mm thick, is about 0.14 mm thick, or is another suitable thickness that allows antenna resonating element 30 to be flexed to accommodate the shape of non-planar opening 32.

With this type of configuration, element 30 can be both sufficiently flexible to conform to curved opening 32 and sufficiently rigid to hold a desired shape without resting on an additional dielectric support structure (e.g., without using a plastic support in cavity 26). Because dielectric support structures can (if desired) be omitted from cavity 26, cavity 26 can be filled exclusively with air. As a result, there will be no dielectric support under antenna resonating element 30 in the interior of cavity 26. This may help reduce performance variations that might otherwise arise when placing element 30 adjacent to a dielectric support (e.g., performance variations that might arise from uncertainty in the small separation between the antenna element and the underlying dielectric support).

Figure 5:
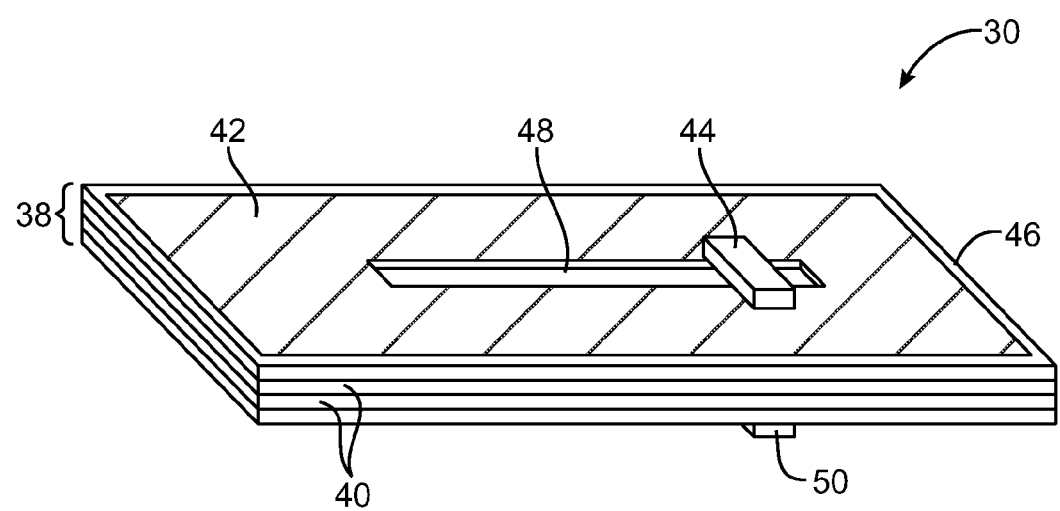
FIG. 5 is a perspective view of a flexible printed circuit substrate on which an antenna resonating element such as a slot antenna resonating element for an electrical device antenna may be formed in accordance with an embodiment of the present invention.

FIG. 5 is a perspective view of an illustrative antenna resonating element. As shown in FIG. 5, antenna resonating element 30 may be formed from a substrate such as a rigid or flexible printed circuit board substrate (substrate 38). Substrate 38 may contain layers of dielectric and patterned metal (shown schematically as layers 40 in FIG. 5). Components such as component 50 may be formed on the underside of substrate 38 (in the orientation of FIG. 5) and components such as component 44 may be formed on the top side substrate 38 (in the orientation of FIG. 5). Configurations in which components are mounted on only a single side of substrate 38 may also be used.

Components 44 and 50 may include electrical components such as surface mount technology (SMT) capacitors, resistors, inductors, switches, filters, radio-frequency connectors (e.g., miniature coaxial cable connectors), cables, clips, or other suitable components. Conductive traces in element 30 (e.g., patterned or blanket metal films on the surfaces of substrate 38 or in layers 40 of substrate 38) may be used to interconnect electrical components and to form antenna resonating element structures. Surface traces may be formed on upper surface 42 of antenna resonating element 30 (i.e., the interior surface of antenna resonating element 30 in the orientation of FIG. 4) or may be formed on the lower surface of antenna resonating element 30 (i.e., the exterior surface of antenna resonating element 30 in the orientation of FIG. 4).

One or more slots for antenna resonating element 30 such as antenna slot 48 may be formed within the layer of metal or other conductive material on surface 42 (or in layers 40). In the example of FIG. 5, slot 48 is formed in within metal layer 42 (e.g., a copper layer). Component 44 may be, for example, an SMT capacitor that bridges slot 48.

During assembly, a ring of conductive material such as a ring of solder formed on a ring of gold or other ring of material at the periphery of surface 42 that accepts solder (i.e., ring 46) may be used to electrically short and thereby seal the edges of antenna resonating element 30 to edges 34 and 36 of antenna cavity 26 (FIG. 4). Solder ring 46, which is sometimes referred to as a sealing ring or conductive sealing ring, may surround the periphery of layer 38 and may have a rectangular shape, a shape with curved edges, a shape with angled edges, a shape with combinations of straight and curved edges, etc.

Figure 6:
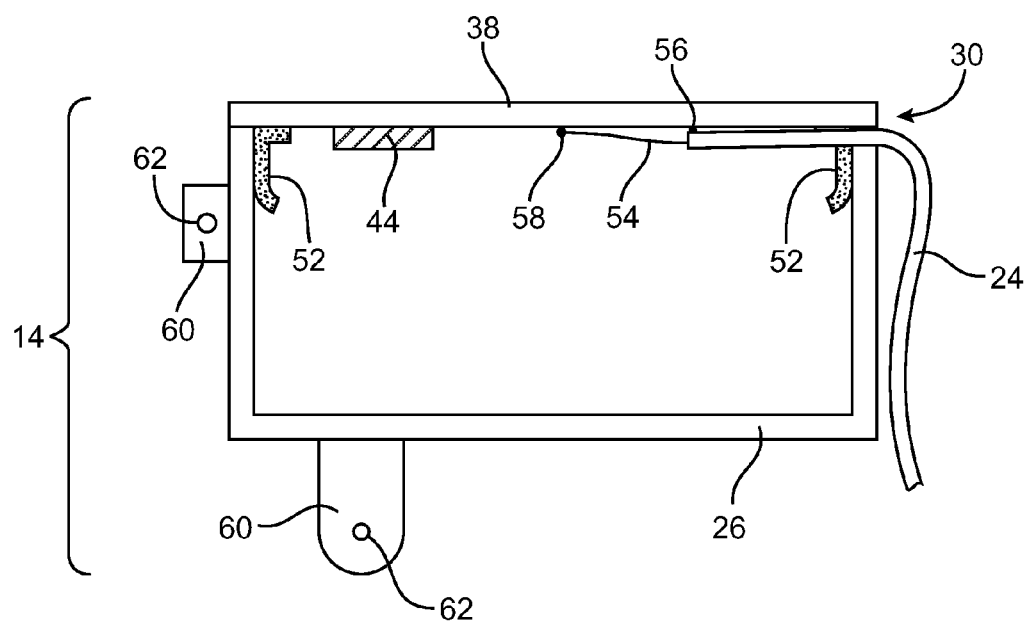
FIG. 6 is a cross-sectional view of an illustrative cavity antenna in accordance with an embodiment of the present invention.

A cross-sectional end view of cavity antenna 14 of FIG. 3 is shown in FIG. 6. As shown in FIG. 6, a transmission line such as coaxial cable 24 may be used to feed antenna 14. Transmitted radio-frequency antenna signals may be routed from transceiver circuitry 22 to antenna 14 using cable 24. During signal reception, received radio-frequency antenna signals may be routed from antenna 14 to transceiver circuitry 22 using cable 24. Cable 24 (or other transmission line structures in device 10) may be coupled to antenna 14 using antenna feed terminals such as positive antenna feed terminal 58 and ground antenna feed terminal 56. Ground feed 56 may be electrically connected to a conductive outer braid in cable 24 (e.g., a ground path in cable 24) using solder or a connector. Positive feed 58 may be connected to positive center wire 54 (e.g., a positive signal path in cable 24) using solder or a connector. Antenna feed terminals 56 and 58 may bridge one or more slots such as slot 48 of FIG. 5.

Alignment brackets (spring clips) such as brackets 52 or other suitable alignment structures (e.g., plastic alignment structures) may be mounted to substrate 38 in antenna resonating element 30 (e.g., using solder, fasteners such as screws, clips, springs, welds, adhesive, etc.). Alignment structures such as brackets 52 may be received within antenna cavity 26 to help to align resonating element 38 with respect to antenna cavity 26 during assembly. If desired, mounting structures such as mounting brackets 60 may be connected to cavity structure 26 (e.g., using welds or other suitable attachment mechanisms). Brackets 60 may be provided with openings such as holes 62. Screws, heat stakes, alignment posts, or other structures may pass through holes 62 when antenna 14 is mounted within housing 12 of device 10.

It may be desirable to provide antenna resonating element 30 and antenna cavity 26 with mating features. Such features may help align antenna resonating element 30 to cavity 26 during assembly.

Figure 7:
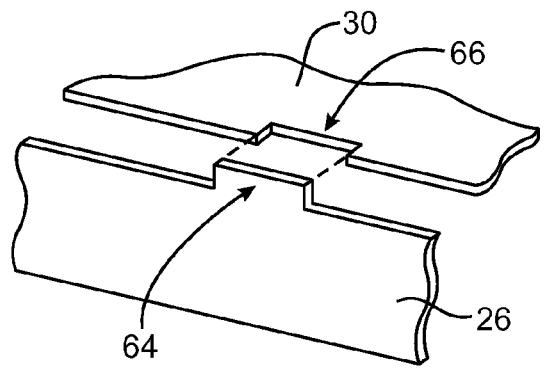
FIG. 7 is an exploded perspective view of a portion of an antenna resonating element and a corresponding portion of an antenna cavity showing how the antenna resonating element and cavity may be provided with mating engagement features in accordance with an embodiment of the present invention.

FIG. 7 shows how antenna resonating element 30 may be provided with engagement features such as recess (groove) 66 and how cavity walls 26 may be provided with mating engagement features such as protrusion (tab) 64. In the FIG. 7 example, protrusion 64 and recess 66 have rectangular outlines. This is merely illustrative. Interlocking structures on resonating element 30 and the walls of cavity 26 may, in general, have any suitable shape (e.g., triangular shapes, shapes with curved edges, shapes with combinations of curved and straight edges, etc.).

Figure 8:
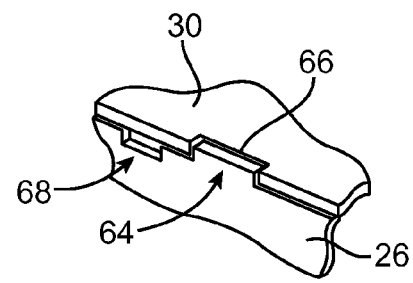
FIG. 8 is a perspective view of a portion of an antenna resonating element and a corresponding portion of an antenna cavity showing how the antenna resonating element and cavity may be provided with mating features and openings to permit the introduction of solder along the cavity seam during manufacturing in accordance with an embodiment of the present invention.
Figure 9:
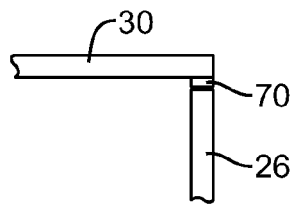
FIG. 9 is a cross-sectional view of an antenna resonating element that has been attached an antenna cavity using a corner joint in accordance with an embodiment of the present invention.
Figure 10:
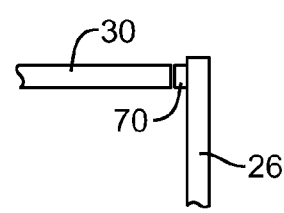
FIG. 10 is a cross-sectional view of an antenna resonating element that has been attached an antenna cavity using a T-joint in accordance with an embodiment of the present invention.
Figure 11:
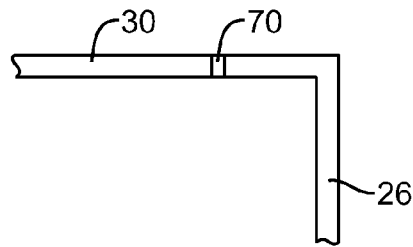
FIG. 11 is a cross-sectional view of an antenna resonating element that has been attached an antenna cavity using a butt joint in accordance with an embodiment of the present invention.
Figure 12:
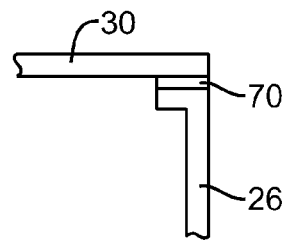
FIG. 12 is a cross-sectional view of an antenna resonating element that has been attached an antenna cavity using a lap joint in accordance with an embodiment of the present invention.

FIG. 8 shows how additional openings such as hole 68 may be formed along the seam between the peripheral edges of antenna resonating element 30 and the corresponding edges of the opening in cavity 26. Openings such as hole 68 may have rectangular shapes, shapes with curved sides, shapes with combinations of curved and straight sides, etc. During fabrication, solder paste may be inserted along the mating edges of antenna resonating element 30 and the walls of cavity 26. Ring-shaped structures of gold or other metals that accept solder may be formed along these peripheral edges (e.g., rings on the edges of antenna resonating element 30 and/or on the edges of cavity 26). When heat is applied to reflow the solder, the solder will wick along the gold ring and, upon cooling, will form a solder seal along the mating edges of antenna resonating element 30 and the cavity 26. A solder mask layer may be formed over exposed metal traces on surface 42 of antenna resonating element 30 to ensure that the solder is confined to the seal region. There may, in general, be any suitable number of engagement structures such as engagements structures 64 and 66 and any suitable number of solder windows such as openings 68 (e.g., 1-20, 10-50, or more than 30).

The edges of antenna resonating element 30 may be connected to the edges of the opening in antenna cavity 26 using a corner joint (e.g., a corner joint of the type shown in FIG. 9), a T-joint (e.g., a T-joint of the type shown in FIG. 10), a butt joint (e.g., a butt joint of the type shown in FIG. 11), a lap joint (e.g., a lap joint of the type shown in FIG. 12), or other suitable joints. As shown in FIGS. 9, 10, 11, and 12, solder 70 or other suitable conductive materials may be used in connecting the resonating element edges and the cavity opening edges along these joints. There may, if desired, be an overlap between the solder and its underlying metal ring on element 30 and the mating surface of the edge of cavity 26. For example, the solder ring may have a width of about 0.7 mm and the edge of the cavity wall may have a width of about 0.2 mm (as an example).

Figure 13:
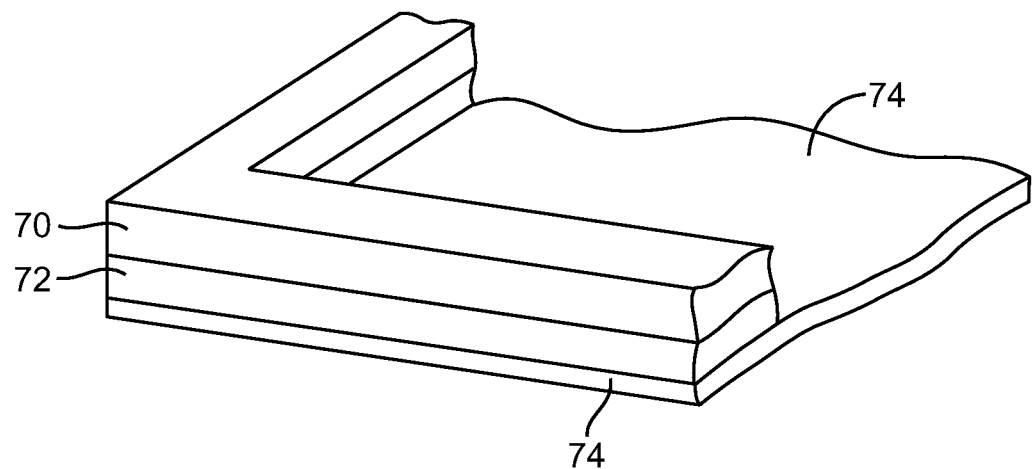
FIG. 13 is a perspective view of a portion of an antenna resonating element showing how a ring of conductive material may be formed around the periphery of the antenna resonating element to short the periphery of the antenna resonating element to the edges of an antenna cavity opening in accordance with an embodiment of the present invention.

FIG. 13 shows a peripheral ring of material such as gold 72 or other solder-attracting materials may be used to promote adhesion of solder 70 to member 74 (e.g., to promote adhesion of solder 70 to the edges of antenna resonating element 30 and/or to the edges of the cavity opening in cavity 26). Gold structures 72 may be deposited and patterned on the surface of member 74 using chemical vapor deposition, physical layer deposition, electrochemical deposition, using shadow masking, photolithography, screen printing, pad printing, painting, spraying, ink-jet printing, or other suitable techniques. Member 74 may be formed from a conductive material (e.g., when forming metal can walls for cavity 26) or from a conductive layer that is formed on a dielectric substrate (e.g., a layer of copper on a dielectric substrate for antenna resonating element 30).

Figure 14:
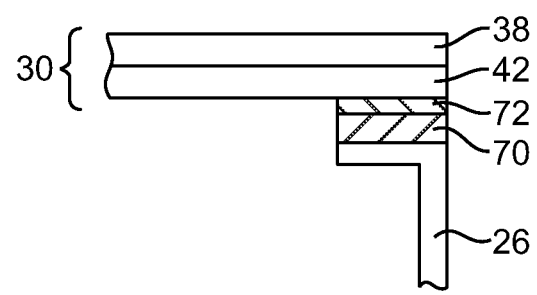
FIG. 14 is a cross-sectional view of a joint between an antenna resonating element and a cavity edge showing how layers of material such as solder may be used in connecting the antenna resonating element to the cavity edge in accordance with an embodiment of the present invention.

FIG. 14 shows a cross-sectional view of a portion of cavity antenna 14 showing how antenna resonating element 30 may include one or more conductive layers such as a layer of metal (e.g., metal layer 42) on a substrate such as substrate 38. Metal layer 42 may be a patterned layer of copper (as an example). The pattern of layer 42 may have an opening that defines a slot for a slot antenna resonating element or may have other suitable antenna resonating element shapes (e.g., inverted-F antenna shapes, patch antenna shapes, strip antenna shapes for monopole antennas, dipole antennas, and loop antennas, etc.). Electrical components such as capacitors, inductors, and resistors may be connected to the pattern of antenna traces that are formed layer 42 on substrate 38 (e.g., to tune antenna 14).

Substrate 38 may be formed from a dielectric such as plastic or a printed circuit board substrate material. For example, substrate 38 may be formed from a flexible printed circuit board substrate such as a substrate formed from a flexible sheet of polymer (e.g., polyimide) or a flexible sheet of fiberglass-filled epoxy (e.g., FR-4).

As described in connection with FIG. 4, use of a flexible structure for the substrate of antenna resonating element 30 allows element 30 to be flexed about a flex axis such as flex axis 33. This permits antenna resonating element 30 to bend and form the shape of a non-planar curved layer that that mates with the curved non-planar opening of the antenna cavity. By using a flexible substrate that is sufficiently rigid to support the traces of the antenna resonating element (e.g., patterned metal layer 42), the need for underlying dielectric support structures can be reduced or eliminated.

As shown in FIG. 14, gold ring structure 72 (or other suitable pattern of metal that is placed around the peripheral edges of antenna resonating element 30) may be coated with solder 70 and thereby attached to cavity 26.

Figure 15:
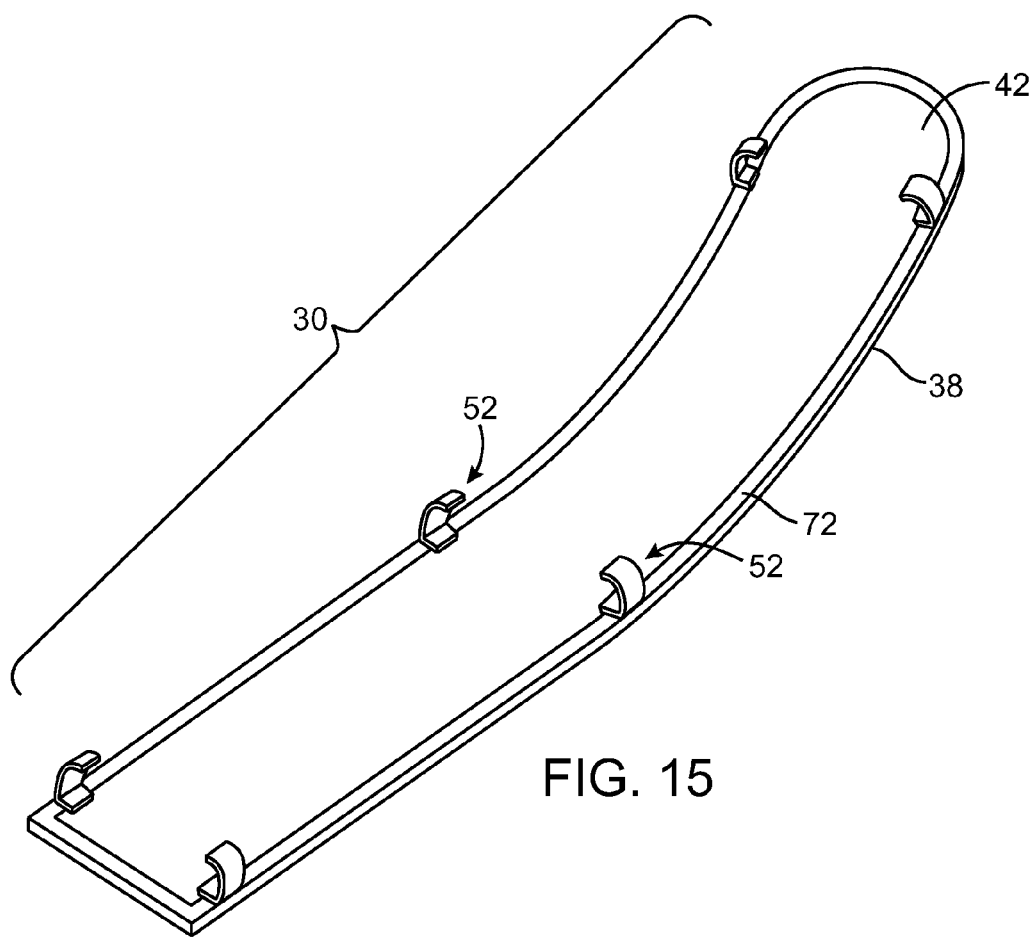
FIG. 15 is a perspective view of an illustrative antenna resonating element showing how the antenna resonating element may be provided with alignment structures such as metal spring clips in accordance with an embodiment of the present invention.

FIG. 15 is a perspective view of an illustrative antenna resonating element. As shown in FIG. 15, antenna resonating element 30 may be formed from a patterned layer of metal such as layer 42 on substrate 38 (e.g., a layer of flexible FR-4). To facilitate mounting of antenna resonating element 30 in cavity 26 during fabrication of antenna 14, antenna 14 may be provided with alignment structures. The alignment structures may, for example, be implemented using metal parts such as metal spring clips, molded plastic parts, parts attached to cavity 26, parts attached to antenna resonating element 30, interlocking structures on both antenna resonating element 30 and cavity 26 (see, e.g., the interlocking structures 64 and 66 of FIG. 8), etc. With the illustrative arrangement shown in FIG. 15, metal clips 52 have been attached to the substrate of antenna resonating element 38 (e.g., using solder, fasteners, adhesive, or other suitable attachment mechanisms).

Figure 16:
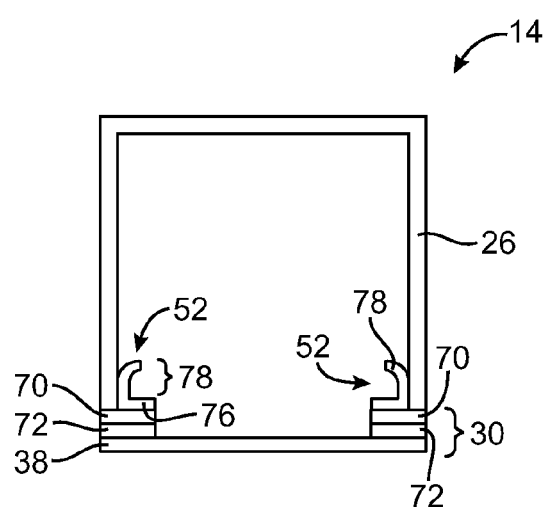
FIG. 16 is a cross-sectional end view of an illustrative cavity antenna showing how alignment structures such as the metal clips of FIG. 15 may be used to orient an antenna resonating element within an antenna cavity for the cavity antenna in accordance with an embodiment of the present invention.

FIG. 16 shows a cross-sectional end view of antenna resonating element 14 in which an antenna resonating element with spring clips 52 has been mounted. Spring clips 52 or such other alignment structures may be provided with base portions 76 that are attached to antenna resonating element substrate 38 using solder 70 and curved portions such as curved portions 78. During assembly, curved portions 78 may help guide structures 52 into the interior portions of antenna cavity 26 and thereby align antenna resonating element 30 to cavity 26.

Figure 17:
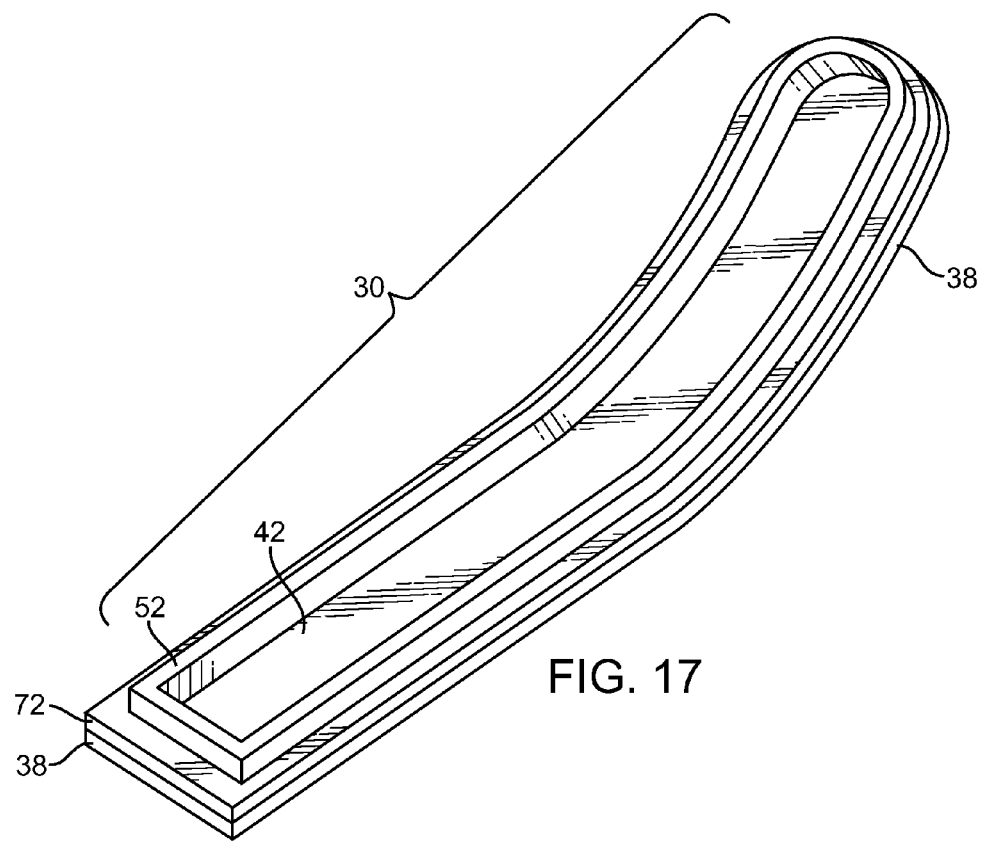
FIG. 17 is a perspective view of an illustrative antenna resonating element showing how the antenna resonating element may be provided with alignment structures such as injection molded plastic alignment structures in accordance with an embodiment of the present invention.
Figure 18:
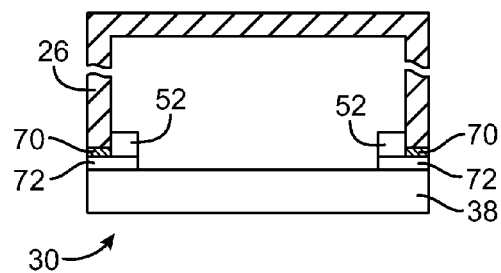
FIG. 18 is a cross-sectional end view of an illustrative cavity antenna showing how alignment structures such as the injection molded plastic alignment structures of FIG. 17 may be used to orient an antenna resonating element within an antenna cavity for the cavity antenna in accordance with an embodiment of the present invention.

In the illustrative arrangement of FIG. 17, alignment structures 52 have been implemented using a polymer ring that runs along the peripheral edge of antenna resonating element 38. Alignment structure 52 of FIG. 17 may be formed by insert molding (as an example). When inserted into cavity 26 as shown in FIG. 18, the outermost edges of alignment structure 52 may be used to guide antenna resonating element 30 into cavity 26, as described in connection with spring clips 52 of FIG. 16.

Particularly when antenna resonating element 30 is formed from a flexible substrate material (e.g., when substrate 38 is a thin layer of flexible FR-4), it may be desirable to use a fixture to hold antenna resonating element substrate 38 and element 30 in place on cavity 26 during solder reflow operations. Any suitable fixture may be used to hold antenna resonating element 30 in place with respect to cavity 26. For example, a metal fixture or a fixture formed of glass, ceramic, or rigid plastic may be used.

With one suitable arrangement, which is sometimes described herein as an example, an elastomeric fixture may be used to hold antenna resonating element 30 in place during at least some of the solder reflow operations used in constructing antenna 14. An elastomeric fixture may exhibit a relatively low heat capacity and low thermal conductivity. This use of this type of fixture may help to prevent situations from arising in which too much heat is applied to the antenna resonating element during reflow operations, which could cause the layers of printed circuit board substrate 38 and antenna resonating element 30 to delaminate. An example of an elastomer that has a suitably low heat capacity and thermal conductivity is silicone. Other types of rubbery substances may be used if desired. The use of silicone and other materials that exhibit elasticity may help the fixture comply with small irregularities in the sizes of the components, thereby minimizing the possibility that gaps might be formed along the seam between antenna resonating element 30 and cavity 26.

Figure 19:
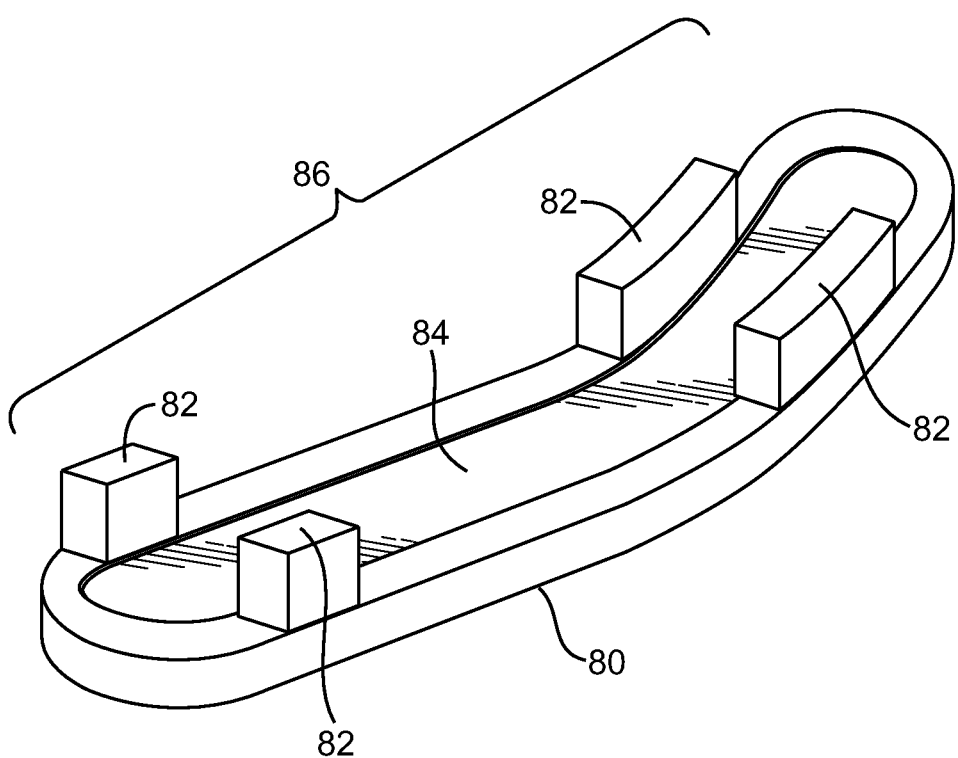
FIG. 19 is a perspective view of an illustrative elastomeric fixture that may be used in holding a flexible antenna resonating element to an antenna cavity during fabrication in accordance with an embodiment of the present invention.

An illustrative elastomeric fixture that may be used to hold elongated antenna resonating elements of the types shown in FIGS. 15 and 17 in place within antenna cavity 26 is shown in FIG. 19. As shown in FIG. 19, antenna assembly fixture 86 may have a main body portion such as main body portion 80 with optional guiding members 82. Guiding members 82 may be formed at discrete locations around the periphery of member 80 or may be formed in a ring shape. The guiding structures may mate with the outer surfaces of cavity 26 and may hold antenna resonating element 30 within central region 84 during assembly operations.

Figure 20:
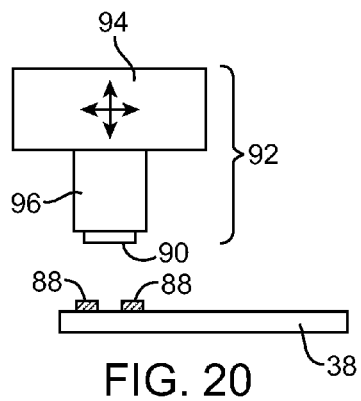
FIG. 20 shows how a surface mount technology (SMT) pick and place tool may be used to mount components to the substrate of an antenna resonating element in accordance with an embodiment of the present invention.

FIGS. 20, 21, 22, 23, 24, and 25 show illustrative equipment and operations involved in assembling antenna 14. As shown in FIG. 20, pick and place tool 92 may be used to mount components such as component 90 (e.g., a capacitor or other antenna tuning element) to printed circuit board substrate 38. Solder paste 88 may be patterned on the surface of substrate 38 prior to placing component 90 in substrate 38. Pick and place tool 92 may have a computerized control stage such as stage 94 that moves head 96 and component 90. Solder paste 88 is sticky and therefore retains components such as component 90 that have been placed on substrate 38.

Figure 21:
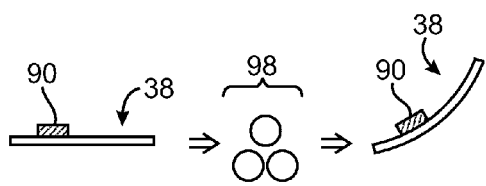
FIG. 21 is a side view of an illustrative roller system that may be used to impart a predetermined curve to an antenna resonating element before performing solder reflow operations in accordance with an embodiment of the present invention.
Figure 22:
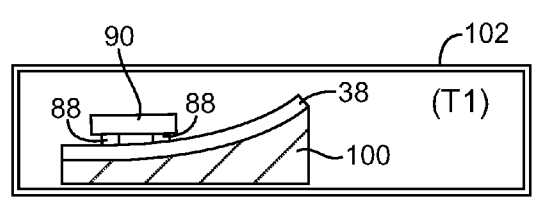
FIG. 22 is a cross-sectional side view of a reflow oven showing how components may be mounted to a pre-flexed antenna resonating element substrate using a solder reflow process performed at a first temperature in accordance with an embodiment of the present invention.

To ensure that components such as components 90 do not disrupt the smooth curved shape into which antenna resonating element 30 is formed when mounted to antenna cavity opening 32 (FIG. 4), it may be desirable to bend substrate 38 before performing solder reflow operations. Antenna resonating element substrate 38 may, for example, be bent using a fixture, manual bending, etc. As shown in FIG. 21, antenna resonating element substrate 38 may be bent by passing substrate 38 through a set of rollers such as rollers 98. When flexed as shown on the right hand side of FIG. 21, the points of contact between the leads of component 90 and the surface of substrate 38 will be slightly closer together on surface 38 than when substrate 38 is in the unflexed position.

Following the flexing operations shown in FIG. 21, substrate 38 may be placed in a solder reflow oven (e.g., oven 102 of FIG. 22) or may otherwise be heated to solder melting temperature T1 (e.g., using a heated fixture, a source of heated air, infrared heat lamps, etc.). Temperature T1 is sufficiently large to convert solder paste 88 into solder and thereby attach components such as component 90 to substrate 38. A curved fixture such as fixture 100 may be used to maintain substrate 38 in its curved shape during these solder reflow operations. Because substrate 38 is curved during the process of attaching components to substrate 38, the attached components will not cause substrate 38 to buckle or exhibit undesired flat portions which might otherwise be formed if the substrate were bent only after components were soldered in place.

After soldering components 90 to substrate 38 at temperature T1, substrate 38 may be soldered to antenna cavity 26. To ensure that the components that have already been attached to substrate 38 do not become detached when soldering antenna resonating element substrate 38 to cavity 26, the solder paste that is used in soldering antenna resonating element 30 to cavity 26 (i.e., solder 70) may have a lower melting temperature than the solder of paste 88.

Figure 23:
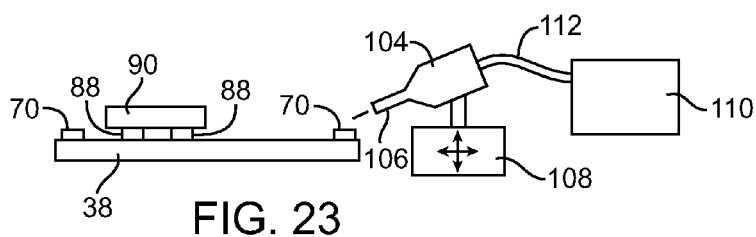
FIG. 23 is a side view of an antenna resonating elements showing how solder may be placed in a ring around the periphery of the antenna resonating element in accordance with an embodiment of the present invention.

The solder that is used to seal antenna resonating element 30 to antenna cavity 26 may be applied to antenna resonating element 30 and cavity 26 using equipment of the type shown in FIG. 23. As shown in FIG. 23, solder paste may be stored in a reservoir such as reservoir 104. Air pump 110 may pressurize reservoir 104 via hose 112. The pressurized solder paste is applied to substrate 38 (as solder paste 70) using needle 106. Computer-controlled positioning stage 108 may be used to accurately control the position of needle 106 relative to the workpiece. In the arrangement shown in FIG. 23, solder paste 70 is being applied to the edges of substrate 38 before substrate 38 is attached to cavity 26. This is merely illustrative. If desired, solder paste 70 may be applied after substrate 38 is attached to cavity opening 32 (e.g., by using the solder dispensing equipment of FIG. 23 to apply solder paste through solder windows such as window 68 of FIG. 8). Solder paste may also be applied to the edges of antenna cavity opening 32 and combinations of these approaches may be used.

Figure 24:
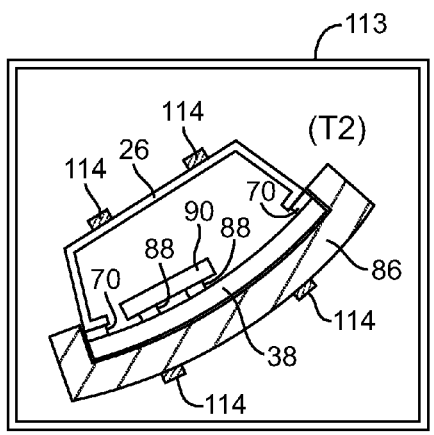
FIG. 24 is a cross-sectional side view of a cavity antenna showing how the antenna resonating element of FIG. 23 may be mounted to an antenna cavity using a solder reflow process at a second temperature that is lower than the first temperature in accordance with an embodiment of the present invention.
Figure 25:
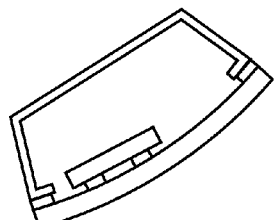
FIG. 25 is a cross-sectional side view of a cavity antenna formed using techniques of the types shown in FIGS. 20, 21, 22, 23, and 24 in accordance with an embodiment of the present invention.

As shown in FIG. 24, antenna resonating element 30 may be mounted to cavity 26 while heat is applied to raise the temperature to solder temperature T2. Heat may be applied using oven 113, or other suitable heating apparatus. Solder paste 70 melts at a lower temperature than solder paste 88, so temperature T2 may be lower than temperature T1. As a result, solder 88 remains solid while solder 70 is being melted to seal antenna resonating element 30 to antenna cavity 26. To ensure that antenna resonating element 30 is well sealed and to ensure that there are no gaps between antenna resonating element substrate 38 and the edges of antenna cavity opening 32, elastomeric fixture 86 may be used to hold antenna resonating element substrate 38 in place against antenna cavity 26 as shown in FIG. 24. Rubber bands 114 or other biasing structures may be used to hold antenna resonating element substrate 38 in place while forming the seal of solder 70 around the periphery of antenna resonating element substrate 38. After soldering at temperature T2 is complete, antenna 14 appears as shown in FIG. 25 (i.e., with fixture 86 removed). If desired, fixture 86 of FIG. 24 may be used during the solder melting operations shown in FIG. 22.

Figure 26:
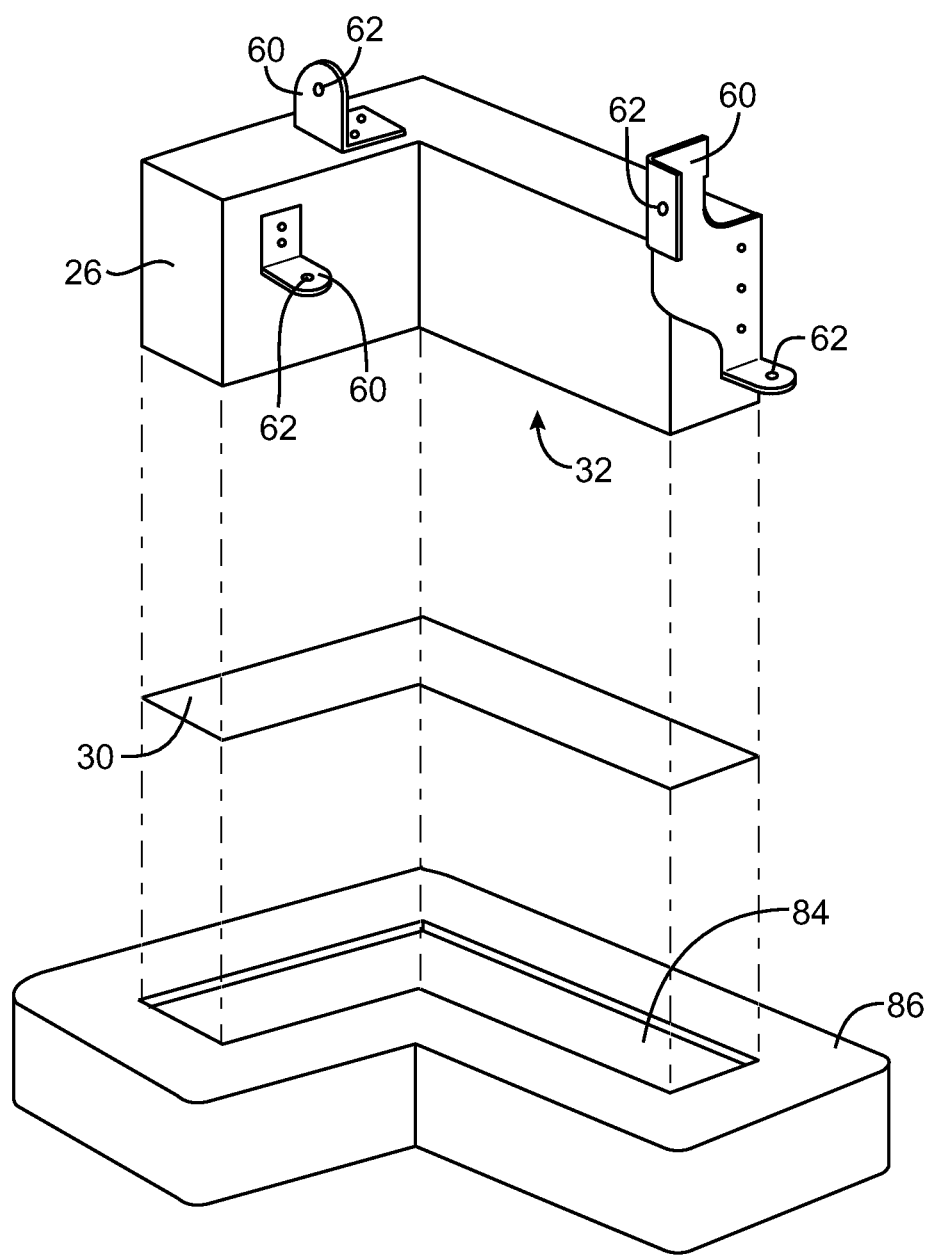
FIG. 26 is an exploded perspective view of a cavity antenna showing how an antenna resonating element for the cavity antenna may be mounted to an antenna cavity using an elastomeric fixture in accordance with an embodiment of the present invention.

Antenna 14 may be formed from cavities of other shapes. A cavity with angled sidewalls is shown in FIG. 26. As shown in FIG. 26, an angled version of elastomeric fixture 86 with an angled recessed portion 84 formed by a peripheral raised ring may be used to hold angled antenna resonating element 30 in place within angled can 26. Mounting brackets 60 may be provided with holes 62 to attach antenna 14 to housing 12 of device 10. Opening 32 may be curved (i.e., the edges of antenna cavity 26 may be curved to mate with antenna resonating element 30 when antenna resonating element 30 is flexed into a curved non-planar shape). Antenna resonating element 30 may also be formed using planar substrates (e.g., using rigid printed circuit boards). Elastomeric fixtures such as fixture 86 may be used in mounting both rigid and flexible antenna resonating elements to antenna cavities.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for forming a cavity antenna, comprising:
soldering peripheral edges of an antenna resonating element to a conductive antenna cavity, wherein the conductive antenna cavity comprises a non-planar antenna cavity opening with curved edges and wherein soldering the peripheral edges of the antenna resonating element to the conductive antenna cavity comprises soldering the peripheral edges of the antenna resonating element to the curved edges of the conductive antenna cavity.

2. The method defined in claim 1 wherein the antenna resonating element has an antenna resonating element substrate, the method further comprising soldering an electrical component onto the antenna resonating element substrate.

3. The method defined in claim 2 wherein soldering the electrical component onto the antenna resonating element substrate comprises soldering the electrical component onto the antenna resonating element substrate at a first temperature and wherein soldering the peripheral edges of the antenna resonating element to the conductive antenna cavity comprises soldering the peripheral edges of the antenna resonating element to the conductive antenna cavity at a second temperature that is lower than the first temperature.

4. The method defined in claim 1 further comprising holding the antenna resonating element to the antenna cavity with an elastomeric fixture while soldering the peripheral edges of the antenna resonating element to the conductive antenna cavity.

5. The method defined in claim 4 wherein holding the antenna resonating element to the antenna cavity with the elastomeric fixture comprises holding the antenna resonating element in a non-planar flexed configuration against curved edges of the conductive antenna cavity.

6. A cavity antenna comprising:
a conductive antenna cavity having conductive walls and a non-planar cavity opening with edges; and
an antenna resonating element having a printed circuit board substrate with a layer of patterned metal, wherein the printed circuit board substrate has edges that are soldered to the edges of the non-planar cavity opening.

7. The cavity antenna defined in claim 6 wherein the printed circuit board substrate comprises a flexed non-planar epoxy substrate.

8. The cavity antenna defined in claim 6 further comprising at least one mounting bracket attached to the conductive antenna cavity.

9. The cavity antenna defined in claim 6 wherein the edges of the cavity opening and the peripheral edges of the printed circuit board substrate are configured to form a lap joint.

10. The cavity antenna defined in claim 6 wherein the edges of the cavity opening and the peripheral edges of the printed circuit board substrate are configured to form a joint selected from the group consisting of: a T-joint, a butt joint, and a corner joint.

11. The cavity antenna defined in claim 6 wherein the antenna resonating element and the antenna cavity have interlocking engagement features.

12. The cavity antenna defined in claim 6 wherein the antenna resonating element and the antenna cavity have interlocking tooth and groove structures.

13. A method for soldering antenna resonating elements to conductive antenna cavities, comprising:
holding an antenna resonating element in place in an opening in an antenna cavity using an elastomeric fixture; and
while holding the antenna resonating element in place with the elastomeric fixture, soldering the antenna resonating element to the antenna cavity.

14. The method defined in claim 13 further comprising bending the antenna resonating element before soldering a component to the antenna resonating element.

15. The method defined in claim 14 wherein soldering the antenna resonating element to the antenna cavity comprises melting solder at a first temperature and wherein soldering the component to the antenna resonating element comprises melting solder at a second temperature that is higher than the first temperature.

16. The method defined in claim 13 further comprising dispensing solder paste onto the antenna resonating element through a hole in the antenna cavity.

17. A cavity antenna comprising:
a conductive antenna cavity having conductive walls and a cavity opening with edges;
an antenna resonating element having a printed circuit board substrate with a layer of patterned metal, wherein the printed circuit board substrate has edges that are soldered to the edges of the cavity opening; and
alignment structures on the printed circuit board substrate that are received within the conductive antenna cavity and that align the antenna receiving element relative to the conductive antenna cavity.

18. The cavity antenna defined in claim 17 further comprising solder windows in the conductive antenna cavity at the edges of the cavity opening.

19. The cavity antenna defined in claim 17, wherein the alignment structures comprise:
plastic alignment structures on the printed circuit board substrate that are received within the conductive antenna cavity and that align the antenna receiving element relative to the conductive antenna cavity.

20. The cavity antenna defined in claim 17, wherein the alignment structures comprise metal alignment clips soldered to the printed circuit board substrate that are received within the conductive antenna cavity and that align the antenna receiving element relative to the conductive antenna cavity.

* * * * *